United States Patent Office 2,797,215
Patented June 25, 1957

2,797,215

PRODUCTION OF TYPE A RIBOFLAVIN CRYSTALS

Julian K. Dale, Terre Haute, Ind., assignor to Commercial Solvents Corporation, Terre Haute, Ind., a corporation of Maryland No Drawing. Application April 28, 1955, Serial No. 504,661

9 Claims. (Cl. 260—211.3)

The present invention relates to a process for obtaining crystalline riboflavin. More particularly, it pertains to a method for securing Type A crystals of riboflavin from amorphous material, crude crystals, or from the more soluble Type B and Type C riboflavin crystals. This application is a continuation-in-part of U. S. Serial No. 252,205, filed October 19, 1951.

In U. S. Patent 2,603,633 by Julian K. Dale, it is revealed that riboflavin crystals of three definite and distinct forms may be prepared, the crystalline form obtained being dependent upon the method and conditions employed for crystallization. Prior to the invention which led to said co-pending application it was known that riboflavin could be made to crystallize to give a pure product. However, the only crystalline form known was the least water-soluble, Type A. Throughout this specification and the appended claims the designations of the three different crystal forms of riboflavin as Type A, Type B, and Type C, are employed in the same sense as in U. S. Patent 2,603,633.

Heretofore Type A riboflavin crystals have been produced by methods involving the use of organic solvents. For example, U. S. Patent 2,421,142 describes a method comprising treatment of an amorphous reddish-brown reduction product of riboflavin with a polar solvent, subjecting the resulting solution to oxidizing conditions to form a super-saturated solution of riboflavin and causing the latter to crystallize out of said solution. That method is a practical one, and has been successfully used commercially, but is subject to the disadvantage that it requires relatively large amounts of organic solvents. In addition, the usefulness of that method is limited by the low solubility of riboflavin in the various solvents which can be used.

I have now discovered that riboflavin can be obtained by treatment of the precipitate obtained by the action of certain types of reducing bacteria on riboflavin solutions, or the precipitate produced by the action of certain chemical reducing agents on said solution with a suitable aqueous alkaline solution. Specifically, the precipitate of the kind first referred to is produced by fermenting a nutrient riboflavin-containing mash with bacteria, in accordance with the procedure described and claimed in U. S. Patent No. 2,387,023. This process consists of inoculating a riboflavin-containing nutrient mash at a predetermined pH with an active culture of bacteria capable of producing a precipitate from which riboflavin can subsequently be secured. Fermentation is permitted to continue until the separation of the precipitate is substantially complete. The precipitate thus obtained may be separated from the fermentation liquor in accordance with any convenient means, such as, for example, by decantation, centrifugation, or filtration. After isolation, the dried bacterial precipitate will ordinarily be found to assay from 60 to 90% of a material which can be converted into riboflavin.

The precipitate obtained by the action of chemical reducing agents on riboflavin-containing solutions is produced in accordance with either of the procedures set forth in U. S. Patents Nos. 2,367,644 and 2,367,646. The process described in these patents deals fundamentally with the use of a reducing agent capable of producing a measured potential in the riboflavin solution of between about −0.250 and −0.600 volt as determined with the calomel half cell at 22° C. Under these conditions, precipitation is effected by converting the riboflavin into a less soluble substance of unknown structure. This less soluble material, as produced in either of the two processes referred to immediately above, and also the substance contained in the precipitate produced by the action of bacteria in the manner indicated in U. S. Patent No. 2,387,023, referred to above, are to be hereafter designated, for the purpose of simplicity, as a riboflavin precursor.

This crude material, obtained as a precipitate and which I can employ in carrying out my invention, is usually a reddish-brown product which, upon being exposed to the atmosphere in a moist condition, assumes a dark green color on the surface thereof. In the case of precipitates produced by the action of chemical reducing agents on riboflavin solutions, there is ordinarily from about 20 to about 95% inert material, depending on which of these two methods of chemical precipitation is utilized.

In place of the riboflavin precursors, described above, I can also use as starting materials in my process crude or impure crystals of Type A, Type B or Type C, mixtures of these types, or I can convert pure crystals of Types B or C into pure crystals of Type A. Type B riboflavin crystals can be produced by neutralizing with an acid, an alkaline solution of crude riboflavin containing about 2 to 4 grams of riboflavin per liter and thereafter allowing the solution to stand at room temperature until crystallization is complete. Type B riboflavin has a complete solubility in water of 80 mg. per liter and a melting point of about 278° C.

In practicing my invention, the crude reddish-brown precipitate, prepared in accordance with the methods of the above discussed patents, or crystalline riboflavin of types other than pure Type A, is dissolved in an aqueous alkaline solution to give a riboflavin concentration of between about 5 and 30 grams per liter. The solution is then filtered and the filtrate is acidified with an acid, whereupon riboflavin immediately separates in a form which may be minute crystals of undetermined type i. e. Type B or lathlike crystals of Type C. This slurry which cannot be effectively filtered is then boiled to convert the crystals therein to Type A, after which it can be filtered and dried. If desired, this operation can be repeated to give a purer crop of Type A crystals. Thus, the Type A crystals can be redissolved in aqueous alkaline solution, a filter aid preferably added, the solution filtered and the clear alkaline filtrate acidified by addition of an acid which again causes a sludge of Type B and C to separate. This sludge is again boiled to convert the riboflavin to crystals of Type A, after which the crystals can be filtered and dried for use.

I am aware of U. S. Patent 2,374,661 by Franz Bergel et al. which relates to the synthesis of isoalloxazine derivatives such as riboflavin and particularly Example 4 of this patent where it is stated that a reaction product of 2-(d-ribitylamino)-4,5-dimethylazobenzene and alloxantin is obtained as a precipitate, dissolved in cold caustic and the solution poured into acetic acid to obtain a precipitate. The example then states that the precipitate is boiled with water, i. e. it is removed from the acetic acid solution, cooled and filtered to remove insoluble material, i. e. the precipitate is now in aqueous solution. The example then states that the filtrate is concentrated and cooled to precipitate riboflavin having a melting point of 278° C., i. e. Type B. Thus by allowing the precipitate obtained when the alkaline solution is acidified to be redissolved in water during the boiling step and then cooling to precipitate riboflavin, Bergel et al. obtain Type B riboflavin. On the other hand, I boil the slurry obtained by acidifying an aqueous alkaline solution of riboflavin or riboflavin precursor, as shown, having a concentration of between about 5 and 30 grams per liter and convert the riboflavin to Type A without the riboflavin in the slurry ever going back into solution.

For the alkaline extraction step of my process, any aqueous alkaline solution which will dissolve from 5 to 30 grams per liter of riboflavin at room temperatures can be used. The alkali metal hydroxides are particularly adaptable for this purpose since very dilute solutions of the hydroxides readily dissolve sufficient quantities of riboflavin. Excellent results are also obtained when aqueous solutions of ammonium hydroxide are used to dissolve the riboflavin. In addition, aqueous solutions of any amine which will dissolve sufficient riboflavin to give a concentration within the range 5–30 grams per liter such as monomethylamine, monoethanolamine, benzyltrimethylammonium hydroxide, etc. can be used. The aliphatic amines are particularly useful for this pose. The aqueous alkaline solution should be of sufficient strength to dissolve between about 5 and 30 grams of riboflavin per liter, but the normality of the alkaline solution should be kept as low as possible.

After the riboflavin or riboflavin precursor has been dissolved in the aqueous alkaline solution, it is desirable to filter the solution so as to separate it from any non-soluble impurities present in the starting crude riboflavin.

After filtration, acid is added to the aqueous alkaline solution containing riboflavin in quantities sufficient to reduce the pH below 7.0, and preferably within the range of about 3.5–5.5. Any acid can be used for this step, particularly good results being obtained with sulfuric, nitric, hydrochloric and phosphoric acids. When the pH of a solution is adjusted to below 7.0 riboflavin precipitates in a form which may vary from small wart-like masses to lathlike crystals or mixtures of these. This slurry is then boiled to convert the precipitated riboflavin into the desired long fibrous needles of Type A. I have found that due to variations in riboflavin precursor filter cakes, the resulting Type A riboflavin crystals are oftentimes very difficult to filter and conversions and yields vary widely. To eliminate these difficulties, I can insert settling and decanting steps in the process just following acidification of the alkaline extract. The precipitate settles rapidly to a volume of about one-fourth of the whole. The supernatant liquor can then be decanted and water equal to about one-half the volume of the decantate added before the slurry is boiled to convert the riboflavin to Type A crystals. By the insertion of these settling and decanting steps, the average purity of the Type A crystals can be increased and the filtration rate of the Type A crystals greatly accelerated.

While I prefer to boil the crystalline slurry in order to convert to Type A riboflavin crystals, equally good results are obtained if the slurry is heated within the range 95–98° C. Heating or boiling should be continued until the crystalline material in the slurry is completely converted into the long silky needles characteristic of Type A crystals, when viewed under the microscope. This usually requires from ½ to 2 hours. The conversion to type A crystals is greatly accelerated if the heated or boiling slurry is seeded generously with previously prepared Type A crystals. A longer boiling time than two hours may be desirable if the original alkali extract or solution was very dilute, conversion being improved by the resulting concentration effect.

After conversion to Type A crystals is complete, the slurry is cooled to a temperature below about 25° C. The crystals are then filtered and washed with water until free of salt. The pure Type A riboflavin crystals are then dried.

The following specific examples will serve to further illustrate the process of my invention:

EXAMPLE I

A 1390 pound portion of a riboflavin precursor filter cake, obtained in the manner disclosed in U. S. Patent 2,367,646, containing 110 pounds of riboflavin precursor was slurried with 300 gallons of 0.1 N sodium hydroxide until the riboflavin precursor was dissolved. The slurry was then filtered in a plate and frame press and the press cake washed with 350 gallons of water. The combined filtrate and wash was then acidified with sulfuric acid to a pH of 4.5 precipitating the riboflavin as small ball-like globules. The slurry was then boiled and seeded at the boiling point with approximately one pound of Type A crystals. The boiling was continued for two hours at which time the riboflavin had been converted to the long fibrous needles characteristic of Type A. The slurry was then cooled and washed with water until free of sulfate. The conversion to Type A crystals in this run was 83% and the crystals had a purity of 91%.

EXAMPLE II

This run was carried out exactly as the one described in Example I except that after the precipitation of the riboflavin by acidification of the alkaline extract, the solid phase was allowed to settle. A 500 gallon portion of the supernatant was decanted and replaced by 250 gallons of water. The slurry was then boiled, seeded, etc. as in Example I. The yield of Type A crystals was 80% and the crystals had a purity of 95%.

EXAMPLE III

Riboflavin crystals prepared by the method of U. S. Patent 2,603,633, which met U. S. P. specifications for ash and specific rotation, but did not meet the solubility requirements for Type C crystals, were converted to Type A crystals by the following procedure: Sufficient Type C crystals to give 20,000 grams of riboflavin by assay were dissolved in 270 gallons of 0.1 N sodium hydroxide solution at room temperature and the solution was pumped into a crystallizer equipped with a steam coil for heating. The pH of the slurry was then adjusted to 3.5–4.0 with dilute sulfuric acid. It was then seeded with Type A crystals and heated to 95–98° C. with steam. Heating was continued until the crystalline material in the slurry was completely converted into long silken needles when viewed under the microscope. As soon as conversion was complete, water was put through the heating coil and the slurry cooled overnight until the temperature fell to below 25° C. The crystals were then filtered and washed with condensate water until free of sulfates. The filter cake was then broken up, dried in a warm air drier, and finally micropulverized.

Results of three runs made by this procedure are tabulated below:

Table I

| Run No. | Conversion, percent | Yield, percent | Specification Data on Product | | | | | |
|---|---|---|---|---|---|---|---|---|
| | | | Solubility, mgs./liter [1] | Assay, percent Riboflavin (dry basis) | Ash, percent | Moisture, percent | Specific Rotation, degrees | Lumiflavin [2] |
| 902R | 81.7 | 89.4 | 98 | 99.7 | .12 | .71 | −116.8 | Negative. |
| 903R | 99.0 | 103.6 | 105 | 99.4 | .14 | 1.50 | −117.2 | Do. |
| 904R | 88.9 | 97.6 | 82 | 98.4 | .10 | .63 | −118.6 | Do. |
| Average | 89.9 | 96.9 | 95 | 99.2 | .12 | .95 | −117.5 | Do. |

[1] Amount in solution when 150 mgs. of sample were shaken with 500 cc. distilled water containing 2.5 cc. glacial $CH_3COOH$.
[2] Tested by the USP method.

EXAMPLE IV

Sufficient crude crystals of riboflavin, prepared in accordance with the method described in U. S. Patent 2,421,142 or in Examples I and II, to give 20,000 grams of riboflavin by assay were slurried with 180 gallons of 0.1 N sodium hydroxide until the riboflavin was completely dissolved. The alkaline solution was filtered through a plate and frame press using 10,000 grams of filter aid. The clear filtrate was pumped into a crystallizer and the filter press cake was washed with 90 gallons of water. The wash was pumped into the crystallizer making a final volume of 270 gallons which assayed approximately 20 grams of riboflavin per liter. The alkaline solution in the crystallizer was then acidified with dilute sulfuric acid to pH 3.5–4.0 and the riboflavin crystallized immediately as small clusters of lathlike crystals of Type C. The crystalline slurry was heated to 95–100° C. then seeded with Type A crystals and held at this temperature until conversion to the long silky needles of Type A was complete when a slide was examined under the microscope. In three runs, this usually required from 4 to 8 hours after the maximum temperature was reached. The crystallizer was then cooled to a temperature below 25° C. and the crystals filtered and washed with water until free of sulfate. The filter press cake was broken up, dried in a warm air drier and the dried crystals micro-pulverized. The results of three runs made by this process are tabulated below.

Table II

| Run No. | Conversion, percent | Yield, percent | Solubility, mgs./liter [1] | Assay, percent Riboflavin (dry basis) | Ash, percent | Moisture, percent | Specific Rotation, degrees | Lumiflavin [2] |
|---|---|---|---|---|---|---|---|---|
| 905R | 105.4 | 111.3 | 66 | 99.4 | .13 | .22 | −112.6 | Negative. |
| 906R | 88.3 | 97.8 | 70 | 98.4 | .11 | .35 | −119.4 | Do. |
| 907R | 88.9 | 97.3 | 67 | 100.1 | .09 | .35 | −120.7 | Do. |
| Average | 94.2 | 102.1 | 68 | 99.1 | .11 | .31 | −117.6 | Do. |

[1] Amount dissolved when 150 mgs. of sample were shaken with 500 cc. distilled water containing 2.5 cc. glacial $CH_3COOH$.
[2] Tested by USP method.

EXAMPLE V

A 15 gram portion of crude riboflavin was dissolved in 1000 ml. of aqueous ammonium hydroxide, the solution filtered and then acidified to pH 4.0 with sulfuric acid to obtain a riboflavin precipitate as a yellow sludge of microscopically rather non-discrete particles. The slurry was then boiled for 30 minutes with seeding at the commencement of boiling with pure Type A riboflavin crystals. The riboflavin was converted into long silken needles of Type A which were filtered, washed, dried and weighed. A recovery of 96.0% was obtained.

EXAMPLE VI

The process of Example V was repeated using monomethylamine in place of ammonium hydroxide. A recovery of 85.3% as Type A riboflavin crystals was obtained.

EXAMPLE VII

The process of Example V was repeated using monoethanolamine instead of ammonium hydroxide. A recovery of 96.0% as Type A riboflavin crystals was obtained.

EXAMPLE VIII

The process of Example V was repeated using benzyltrimethylammonium hydroxide in place of ammonium hydroxide. A recovery of 88.0% as Type A riboflavin crystals was obtained.

What I claim is:

1. A process for preparing Type A riboflavin crystals which comprises dissolving a member selected from the group consisting of crude riboflavin crystals and riboflavin precursors in a base selected from the group consisting of alkali metal hydroxides, ammonium hydroxide, and aliphatic amines to form a solution containing from about 5 to about 30 grams per liter of riboflavin, acidifying said solution to obtain a riboflavin precipitate and then boiling the resultant acidified slurry until Type A crystals are formed.

2. A process for preparing Type A riboflavin crystals which comprises dissolving a member selected from the group consisting of riboflavin precursors, Type B riboflavin crystals, Type C riboflavin crystals and mixtures of Type B and C riboflavin crystals in a base selected from the group consisting of alkali metal hydroxides, ammonium hydroxides, and aliphatic amines to obtain a solution containing from about 5 to about 30 grams per liter of riboflavin, acidifying said solution to obtain a riboflavin precipitate and then boiling the resultant acidified slurry until Type A crystals are formed.

3. A process for preparing Type A riboflavin crystals which comprises dissolving crude riboflavin crystals in a base selected from the group consisting of alkali metal hydroxides, ammonium hydroxides, and aliphatic amines form a solution containing from about 5 to about 30 grams per liter of riboflavin, acidifying said solution to obtain a riboflavin precipitate and then boiling the resultant acidified slurry until Type A crystals are formed.

4. A process for preparing Type A riboflavin crystals which comprises dissolving a riboflavin precursor in a base selected from the group consisting of alkali metal hydroxides, ammonium hydroxides, and aliphatic amines to form a solution containing from about 5 to about 30 grams per liter of riboflavin precursor, acidifying said solution to obtain a riboflavin precipitate and then boiling the resultant acidified slurry until Type A crystals are formed.

5. A process for preparing Type A riboflavin crystals which comprises dissolving a riboflavin precursor in a base selected from the group consisting of alkali metal hydroxides, ammonium hydroxides, and aliphatic amines to form a solution containing from about 5 to about 30 grams per liter of riboflavin precursor, acidifying said solution to obtain a riboflavin precipitate, allowing the resulting mixture to settle, decanting the supernatant liquid, adding water and then boiling the resulting acidified slurry until Type A crystals are formed.

6. A process for preparing Type A riboflavin crystals which comprises dissolving a member selected from the group consisting of riboflavin precursors, Type B riboflavin, Type C riboflavin and mixtures of Type B and Type C riboflavin crystals in a base selected from the group consisting of alkali metal hydroxides, ammonium hydroxides, and aliphatic amines to form a solution containing from about 5 to about 30 grams per liter of riboflavin, filtering said solution, adjusting the pH of the filtrate to a value below 7.0 to obtain a riboflavin precipitate, heating the resulting acidified slurry to a temperature between about 95° C. and the boiling point of said slurry until the crystals are converted into Type A, and recovering said Type A riboflavin crystals.

7. A process for preparing Type A riboflavin crystals which comprises dissolving a member selected from the group consisting of riboflavin precursors, Type B riboflavin, Type C riboflavin, and mixtures of Type B and Type C riboflavin crystals in a base selected from the group consisting of alkali metal hydroxides, ammonium hydroxides, and aliphatic amines to form a solution containing from about 5 to about 30 grams per liter of riboflavin, filtering said solution, adjusting the pH to a value between 3.5 and 5.5 to obtain a riboflavin precipitate, heating the resulting acidified slurry to a temperature between about 95° C. and the boiling point of said slurry until the crystals are converted into Type A, and recovering said Type A riboflavin crystals.

8. A process for preparing Type A riboflavin crystals which comprises dissolving Type C riboflavin crystals in an aqueous alkaline solution selected from the group consisting of alkali metal hydroxides, ammonium hydroxides, and aliphatic amines to form a solution containing from about 5 to about 30 grams per liter of riboflavin, adjusting the pH of the solution to 3.5 to 4.5 to precipitate the riboflavin, seeding the resultant acidified slurry with Type A crystals, heating the slurry to 95–98° C. for ½–2 hours, cooling and recovering Type A crystals.

9. A process for preparing Type A riboflavin crystals which comprises dissolving a riboflavin precursor in an aqueous base selected from the group consisting of alkali metal hydroxides, ammonium hydroxides, and aliphatic amines to obtain a solution containing from about 5 to about 30 grams per liter of riboflavin precursor, filtering said solution, adjusting the pH of the filtrate to a value below 7.0 to obtain a riboflavin precipitate, allowing the resulting crystals to settle, decanting the supernatant liquid, adding an amount of water equivalent to about one-half the volume of the decantate, heating the resulting acidified slurry to a temperature between about 95° C. and the boiling point of the mixture until the crystals are converted to Type A, and recovering said Type A riboflavin crystals.

References Cited in the file of this patent

UNITED STATES PATENTS 2,374,661    Bergel et al. _____ May 1, 1945